United States Patent [19]
Gans et al.
[11] 3,743,941
[45] July 3, 1973

[54] DIVERSITY RECEIVER SUITABLE FOR LARGE SCALE INTEGRATION

[75] Inventors: Michael James Gans, New Shrewsbury Township; Douglas Otto John Reudink, Colts Neck, both of N.J.

[73] Assignee: Bell Telephone Laboratories Incorporated, Murray Hill, Berkeley Heights, N.J.

[22] Filed: Oct. 28, 1971

[21] Appl. No.: 193,414

[52] U.S. Cl. .................. 325/305, 325/363, 325/420, 329/122
[51] Int. Cl. .................. H04b 7/08
[58] Field of Search ............ 325/346, 419, 420–422, 325/363, 364, 305, 301; 329/50, 122; 178/69.5 R; 331/18, 30

[56] References Cited

UNITED STATES PATENTS 3,631,344 12/1971 Greenwald .......................... 325/305
3,447,084 5/1969 Haner et al. .................... 325/421 X
3,564,434 2/1971 Camenzind et al. .............. 331/23 X

*Primary Examiner*—Benedict V. Safourek
*Attorney*—W. L. Keefauver et al.

[57] ABSTRACT

The cost of a diversity receiver is reduced by providing branch circuits which can be fabricated by large scale integration techniques. To this end nonintegrable filters are eliminated and lead connections are minimized. Filtering is provided by a phase-locked loop which passes only the single frequency band to which it is locked. Channel acquisition is achieved by initially swamping all branches with an unmodulated acquisition signal at a frequency selected to cause all branches to lock on one channel. The acquisition signal, which may be introduced at numerous points, is removed after lock-on in order to permit detection of the intelligence modulation.

16 Claims, 4 Drawing Figures

DIVERSITY RECEIVER SUITABLE FOR LARGE SCALE INTEGRATION

BACKGROUND OF THE INVENTION

This invention relates to frequency selective circuits, and more particularly, to diversity radio circuitry suitable for fabrication by large scale integration techniques.

Many radio systems, especially mobile radio systems, are designed with diversity capability in order to reduce the effects of fading. In particular, a predetection diversity receiver, known as the Granlund combiner, operates to cophase modulated signals received by a space diversity array without the use of transmitted pilots. A number of versions of this receiver are shown in United States Pat. No. 3,471,788, issued to W. J. Bickford et al. Oct. 7, 1969.

Each branch of the Granlund receiver receives from one antenna of an array a signal which is randomly phased with respect to the others. The IF signal is divided by a power splitter; one portion is mixed with a feedback sample of the combined output and the resulting difference product, which contains no modulation but only the random phase, is slot filtered by a narrowband filter and amplified. The other portion of the IF signal containing both the modulation and the random phase is fed forward and mixed with the filtered difference product to produce a second difference product which contains the modulation without the random phase. In this manner all branches are cophased and may be summed directly.

A sample of the combined output is fed back and applied to the slot filter which is tuned to the difference between the receiver's input and output frequencies. This feedback loop allows the branch to establish a selected output frequency which is common to all branches.

Diversity branch circuits generally and the Granlund type combiner in particular, provide the improved reception due to their cophasing capability but for systems having a large number of receivers, such as a high capacity mobile radio system, and those having a large order diversity receiver, it would be economically advantageous if the branches could be fabricated by large scale integrated circuit techniques. However, the required slot filter in the conventional diversity branch design makes such fabrication impossible since the filter is not integrable by present state of the art techniques.

It is an object of the present invention to provide a predetection diversity branch circuit which is integrable.

SUMMARY OF THE INVENTION

In accordance with the present invention, an integrable diversity branch circuit is designed with a phase-locked loop serving as the slot filter. The loop passes a narrowband signal at a frequency which is the difference between the branch signal and the combined output frequencies. This narrowband signal contains the random phase associated with the individual branch, but is free of intelligence modulation. It acts as a pilot and is combined with the branch signal to cancel the random phase and hence yield an output which is in-phase with the outputs of all other branches.

The branch circuit is suitable for large scale integration because the only filter in the circuit is an integrable lowpass filter which is part of the phase-locked loop. No other filters are needed in the branch circuits and any additional filters required by the system are common to all branches and hence their lack of integrability offers no serious problem.

The phase-locked loop which is used as the frequency selective device passes a narrowband signal on to which it has locked. However, if the frequency of the relatively weak pilot signal is outside the pull-in range of the phase-locked loop, lock-on will not occur, and the circuit will not operate. In accordance with the present invention, a strong acquisition signal of an appropriate frequency is used to swamp the phase-locked loop input causing the loop to widen its effective pull-in range and lock on to the pilot signal frequency. Once lock-on is acquired, the swamping signal is removed and lock is maintained if the frequency of the desired pilot signal is within the loop's tracking range.

This acquisition technique is applicable to all circuits having phase-locking loops. It is, however, especially well suited to integrated circuit receivers and particularly diversity system receivers in which the acquisition oscillator may also provide channel selection capability.

DETAILED DESCRIPTION

A cophased diversity array which is not affected by distorted wavefronts and automatically points in the right direction, is ideally suited for many radio system applications. However, where high gain (30–60 db) is required an array of many elements (on the order of $10^3$ to $10^6$) may be necessary, and systems, such as high capacity mobile telephone systems which may not require such high order diversity, do need a large number of similar diversity receivers, each containing numerous identical circuits. To build such diversity systems at a reasonable cost is practical only if the many diversity branches can be constructed by large scale integrated circuit techniques and this is feasible only if each branch contains no bandpass filters, no inductors and requires few connection leads and components.

Figure 1:
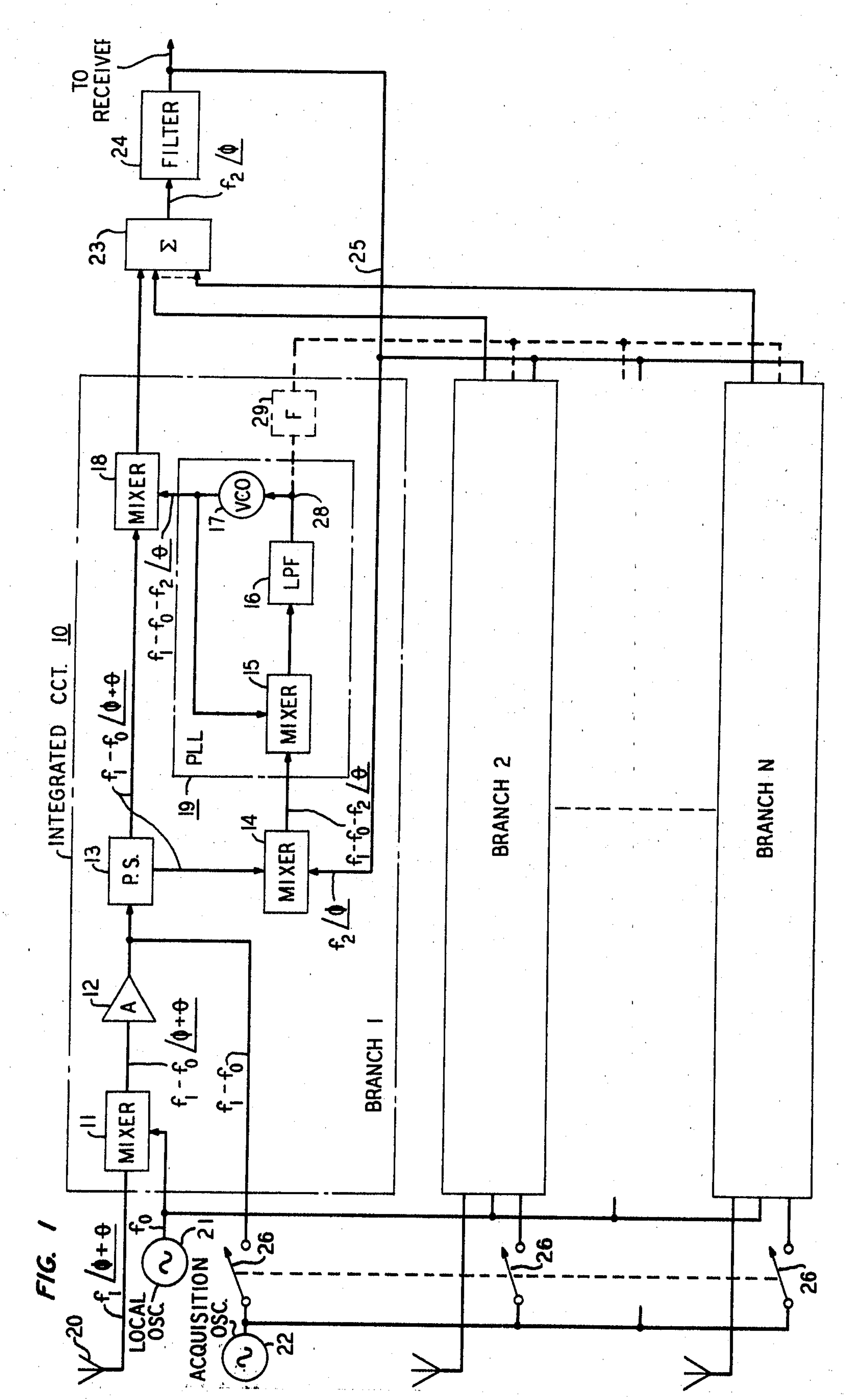
FIG. 1 is a block diagram of a diversity receiver showing an integrable branch circuit in accordance with the present invention.

The branch circuitry described herein and illustrated as part of the receiver in FIG. 1 satisfies these requirements and is suitable for large scale integration. The cophasing is accomplished by the feedback method as in the Granlund combiner described hereinbefore. System requirements determine how many identical branches, 1, 2 . . . N, are employed and the following discussion of branch 1 is presented as a representative example.

Under operating conditions an undistorted signal $f_2 \underline{/\phi}$ 27 is assumed to be present at the output of combiner 23 where $f_2$ is the output frequency to which output filter 24 and the demodulator of the receiver are tuned and $\phi$ represents the intelligence information which may be in the form of frequency, phase or other appropriate modulation. The incoming reception $f_1 \underline{/\phi + \theta}$ received on branch antenna 20, which is one element of a space diversity array and may be any type antenna appropriate to the reception frequency, is mixed with a signal $f_0$ from local oscillator 21 in mixer 11 to yield the intermediate frequency (IF) branch signal $f_1 - f_0 \underline{/\phi + \theta}$, where $f_1$ is the incoming signal frequency, $\theta$ is the random branch phase acquired during propragation and $f_0$ is the local oscillator frequency. Conversion mixer 11 which may be a diode for microwaves or a photo conductor at optical frequencies is part of integrated circuit 10. The signal from local oscillator 21 may be fed into circuit 10 and mixer 11 via a strip line distribution network for microwaves or by radiation for optical waves. The IF conversion is of course unnecessary if suitable branch circuitry is available at the reception frequency. To preserve the noise figure, the output of mixer 11 is applied directly to amplifier 12; since neither IF filtering nor channel selection is provided, the amplifier does not require crystal filters or inductors and is easily constructed as part of the integrated circuit.

A small portion of the IF branch signal $f_1 - f_0 \underline{/\phi + \theta}$ is tapped off by power splitter (P.S.) 13, which may be a 10 db coupler for example, and mixed in mixer 14 with the combiner output $f_2 \underline{/\phi}$ which is applied via feedback path 25. The difference product $f_1 - f_0 - f_2 \underline{/\theta}$ is termed an intelligence-free signal, since at this precise frequency, $f_1 - f_0 - f_2$, the information modulation $\phi$ has been cancelled leaving only the medium distortion $\theta$. The bandwidth of the medium distortion centered about $f_1 - f_0 - f_2$ is small relative to the bandwidth of the information modulation but the total intelligence-free signal from mixer 14 is broadband and may include, in addition to the distortion component, spurious signals and interference from adjacent channels. This intelligence-free signal may be used as a pilot to cophase the branch reception of branch 1 with the reception of the other branches providing it is narrowband filtered to pass only the distortion component associated exclusively with branch 1. Hence, the signal is applied to phase-locked loop 19 which acts as a narrowband filter centered at $f_1 - f_0 - f_2$.

Loop 19 consists of voltage controlled oscillator (VCO) 17, loop mixer 15 and lowpass filter 16 connected as shown. The phase-locked loop is a satisfactory filter giving a constant amplitude input to phase-correction mixer 18 which is also part of the integrated circuit 10. The filtered pilot signal $f_1 - f_0 - f_2 \underline{/\theta}$ is mixed in mixer 18 with the remainder of the IF branch signal $f_1 - f_0 \underline{/\phi + \theta}$ from power splitter 13. The phase distortion $\theta$ is cancelled from the difference product, leaving the desired output signal $f_2 \underline{/\phi}$ which is combined with the cophased outputs from the other branches by linear combiner 23, thus confirming the initial assumption that the combiner output is $f_2 \underline{/\phi}$.

The output of combiner 23 is passed through output filter 24 in order to define the output frequency band and to eliminate noise, interference from adjacent channels and spurious signals. Since one final filter is common to all branches, it can be of high quality without significantly affecting the overall system cost and complexity. For example, in mobile telephone systems filter 24 may be a crystal filter which is not integrated; in systems in which neither stability nor sharp filter characteristics are required the filter could, however, be another phase-locked loop which would permit the entire receiver to be formed of integrated circuits.

The diversity branch circuit illustrated in FIG. 1 provides only phase correction and no amplitude weighting; it therefore functions as an equal gain combiner in contrast to a maximal ratio combiner. However, when using feedback diversity, the equal gain configuration is more stable than the maximal ratio arrangement and with large order diversity, the signal-to-noise ratio statistics are only one db better for maximal ratio combiners than for equal gain combiners.

The use of a phase-locked loop instead of a conventional bandpass filter has the advantage of permitting construction of the entire branch circuit as an integrated circuit since the need for crystal filters and inductors is eliminated and lowpass filter 16 requires only resistive and capacitive elements. The ease with which such loops can be built as integrated circuits is well known.

The phase-locked loop pass frequency is not, however, permanently fixed. It is established by the free-running frequency of the voltage controlled oscillator and by the loop input. The free-running frequency may vary with environmental changes and, if the loop is part of an integrated circuit, substantial variation is likely during the life of the circuit. Furthermore, the intelligence-free signal derived from the reception may be too weak to be pulled in by the phase-locked loop if the free-running and the pilot frequency of the desired channel are not sufficiently close.

Acquisition and lock-on to the pilot signal of a specified channel may be assured by closing acquisition switch 26 to apply a strong signal from appropriately tuned acquisition oscillator 22. This acquisition signal combines with and swamps the relatively weak pilot generated by the branch circuit causing phase-locked loop 19 to lock on to the desired frequency. If this unmodulated signal is at the IF branch frequency $f_1 - f_0$, it acts as an auxiliary IF input and the amplitude of the acquisition signal is made sufficient to insure that loop 19 will lock on $f_1 - f_0 - f_2$. After the loop is locked, switch 26 is opened and, if the switching time is small compared to the inverse bandwidth of lowpass filter 16, the loop will remain locked provided the pilot frequency is within the tracking range of the phase-locked loop. In order to keep the N branches isolated switch 26 should be an N-pole, single-throw device. Alternatively, isolation can be provided by intentional mismatches since loss of acquisition signal power is easily supplemented. If the diversity array is large enough, the acquisition procedure will rarely have to be repeated since the fading range of large diversity systems is very small.

The acquisition oscillator may also serve an additional function. In a multichannel system channel selection may be provided by tuning the frequency of local oscillator 21 in a conventional manner, but channels may also be selected by adjusting the pilot frequency. This may be accomplished by appropriately tuning acquisition oscillator 22. The selected channel pilot frequency must, of course, be within the tracking range of the phase-locked loop. Varying both oscillators 21 and 22 is also possible.

Figure 2:
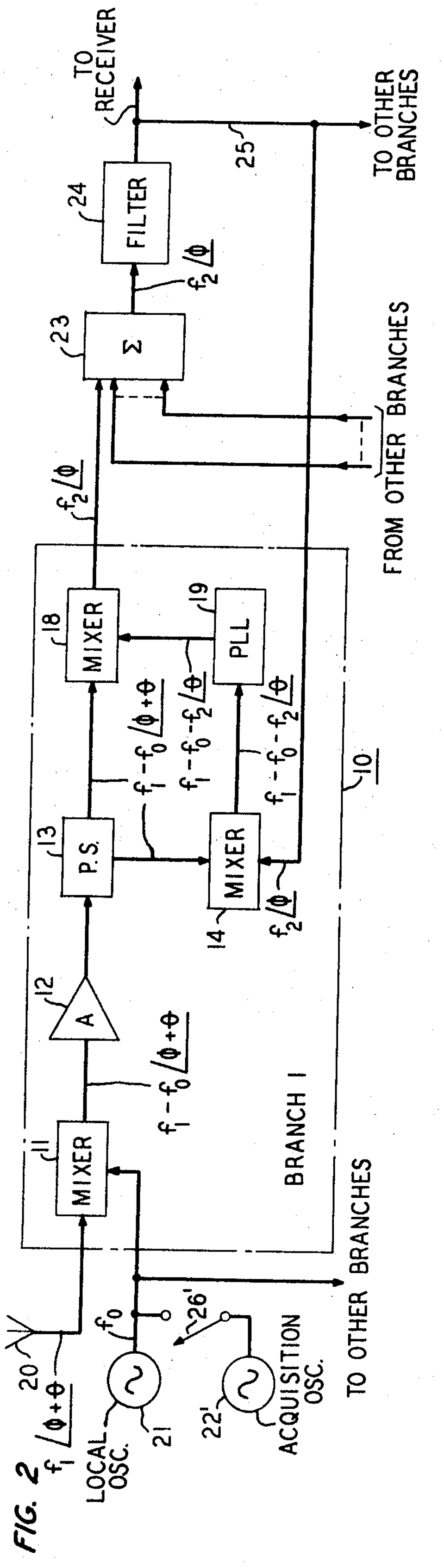
FIGS. 2 and 3 illustrate branch circuits having alternative arrangements of the acquisition subcircuit in accordance with the present invention.
Figure 3:
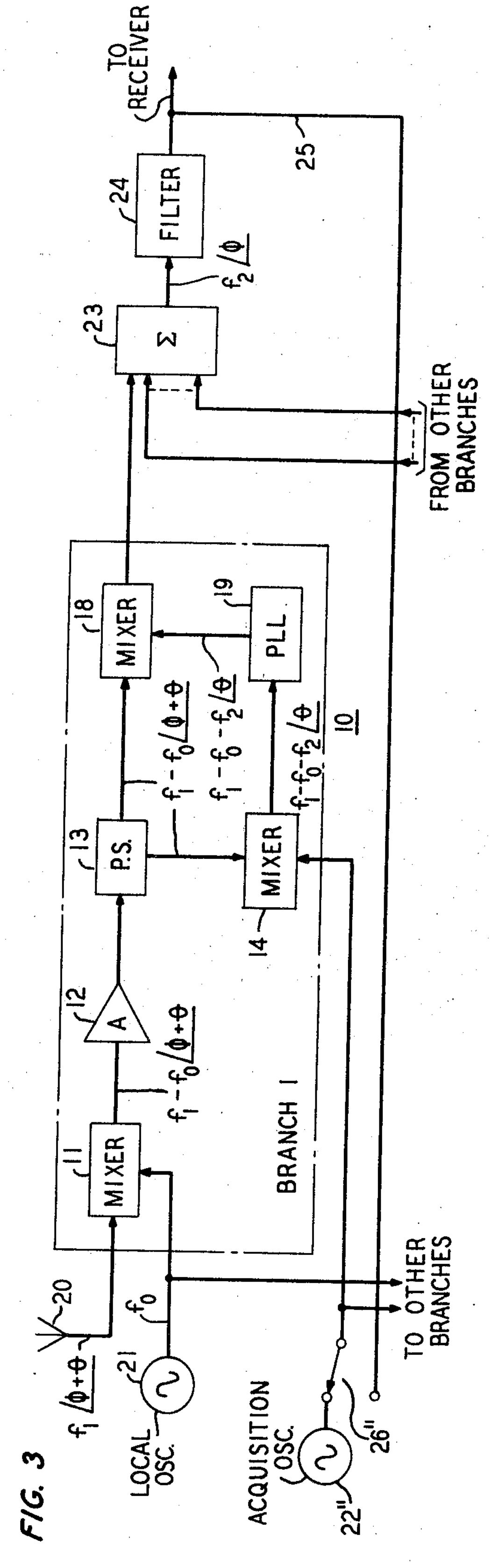

In addition to applying the acquisition signal to the amplified IF branch signal as shown in FIG. 1, the acquisition signal could be applied at numerous other points in the branch circuit. Alternative arrangements are illustrated in FIGS. 2 and 3. In FIG. 2, the acquisition signal from oscillator 22′ is applied to IF mixer 11 on the same path as the signal from local oscillator 21. The acquisition signal may be at either $f_1$ or $f_1-f_0$. If the signal is at $f_1$, it will be downconverted in mixer 11 along with the received signal, but since the local oscillator path is designed to reject $f_1$ and, the mixer is usually balanced to reject noise on the oscillator circuit at $f_1$, there will be a large loss of power in the acquisition signal when it is downconverted. If the acquisition signal is at $f_1-f_0$, it will leak through mixer 11, and again a large loss will result unless an IF bypass is provided. The loss produced in either of these cases is, however, acceptable since the power of the acquisition signal is easily maintained at a level sufficient to provide swamping. The FIG. 2 configuration permits acquisition switch 26′ to be a single pole device and one less lead connection is required in each integrated branch circuit than would be required in the arrangement of FIG. 1.

FIG. 3 illustrates another alternative arrangement. The acquisition signal from oscillator 22″ is applied to mixer 14 in lieu of the feedback signal on path 25. In this case oscillator 22″ is tuned to generate a signal at $f_2$ to force loop 19 to lock on to $f_1-f_0-f_2$. This arrangement allows the use of a single pole switch and requires no additional leads for the acquisition signal. However, since the acquisition switch 26″ interrupts the feedback signal, uncancelled modulation $\phi$ from the reception will prevent lock-on. Accordingly, while switch 26″ is connecting acquisition oscillator 22″ to mixer 14, modulation at the transmitter must be suspended. After lock-on acquisition switch 26″ is reset to apply the feedback signal to the mixer and transmission of modulation may be resumed.

Figure 4:
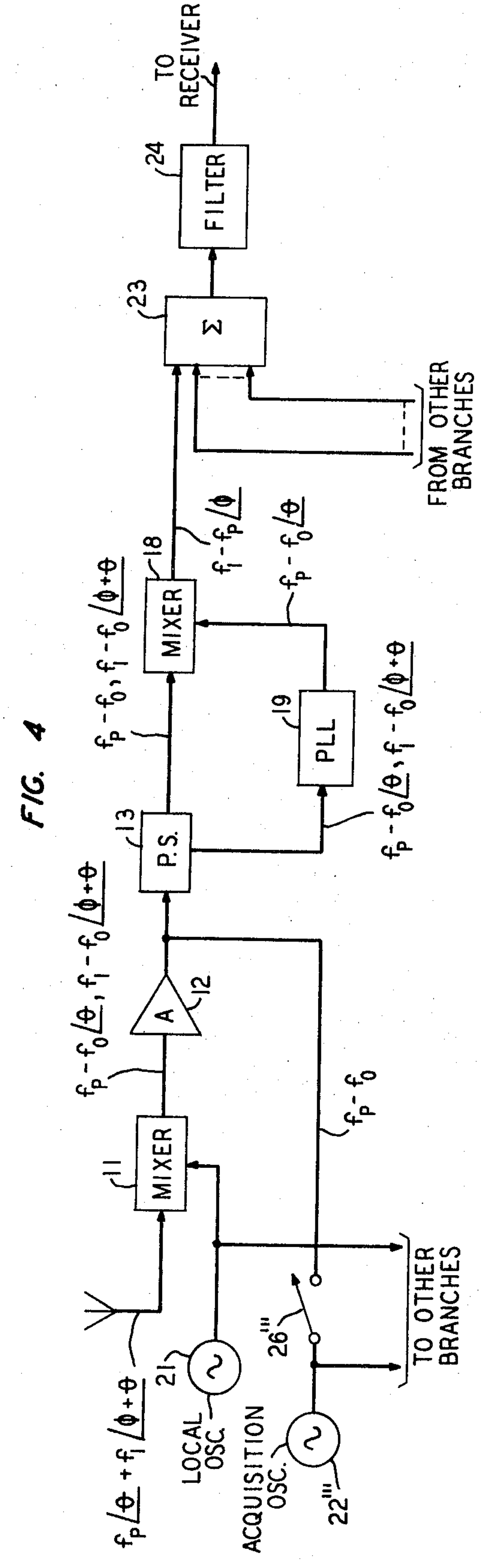
FIG. 4 is a block diagram of a pilot-type diversity system having acquisition capability in accordance with the present invention.

The acquisition oscillator technique may be used in many other circuits having phase-locked loops, it is not limited to the Granlund combiner. For example, FIG. 4 illustrates a pilot-type diversity combiner which is similar in all respects to the branch circuitry of FIG. 1 except that mixer 14 and feedback path 25 are replaced by a direct connection from power splitter 13 to phase-locked loop 19. In this system, a true pilot $f_p$ is transmitted without modulation, together with the modulated signal $f_1 \angle\phi$. They are received as $f_p \angle\theta$ and $f_1 \angle\phi+\theta$. The received pilot is downconverted at mixer 11 and narrowband filtered by loop 19 as was the intelligence-free signal in the circuits of FIGS. 1 through 3. Acquisition oscillator 22‴ generates a frequency $f_p-f_0$ which swamps the IF branch signal and causes loop 19 to lock on to it. Once locked, the difference output of cophasing mixer 18 will be $f_1-f_p \angle\phi$ for all branches. Different channels may be selected by changing the output frequency of oscillator 22‴. The selection signal may, of course, be alternatively applied along the local oscillator path as illustrated in FIG. 2.

As has been noted hereinabove, environmental changes may cause the voltage controlled oscillators to drift and therefore the pass frequency of the phase-locked loop may vary. If in the system shown in FIG. 1 one voltage controlled oscillator loses lock, it also loses its dc input component and will tend to return to its free-running frequency which may be beyond the pull-in range of the loop under operating conditions. However, if the receiver consists of many identical voltage controlled oscillators and some of the others have not lost lock, they will still have their proper dc input levels when the first begins to drift. It is therefore possible to gang the input points 28 of all voltage controlled oscillators 17 so that as one goes out of lock, the others act to restore its dc level and hence its lock. Accordingly, such compensation can be provided, as shown in the dashed subcircuit of FIG. 1 by a dc path which interconnects points 28 at the inputs of oscillators 17 in each branch. The dc path contains very lowpass filters 29 which provide ac isolation.

The dc interconnection inherently widens the effective tracking range of the entire receiver enabling it to maintain lock over a broader frequency range. Alternatively, the effective tracking range of each branch may be increased by providing a high dc gain in each phase-locked loop.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit of the invention.

What is claimed is:

1. In a diversity receiver having a plurality of branches a diversity branch circuit comprising:
- means for receiving a signal containing transmitted information common to all branches and phase information distinctive to the individual branch,
- means for producing a pilot signal containing the distinctive phase information and being free of the transmitted information,
- means for temporarily conbining with the received signal on each branch an acquisition signal common to all branches,
- means for slot filtering the pilot signal, the slot frequency being determined by the acquisition signal, and
- means for mixing a portion of the received signal with the slot filtered pilot signal to produce an output signal at a frequency common to and in-phase with the output signals of all of the other branches.

2. A diversity branch circuit as claimed in claim 1 wherein said means for slot filtering is a phase-locked loop and the acquisition signal swamps the input of the phase-locked loop to cause it to lock onto the determined slot frequency.

3. A diversity receiver comprising:
- a plurality of antenna elements,
- a plurality of branch circuits each having a branch signal derived from the reception of an exclusive one of the elements, each of said branch signals containing transmitted the received in common by all elements and a phase indication received exclusively by said one element,
- each branch circuit including mixing means for generating from the branch signal an intelligence-free signal containing the phase indication exclusive to said one element, means for narrowband filtering th e intelligence-free signal, cophasing means for combining the branch signal and the filtered intelligence-free signal to yield an output signal at a prescribed output frequency common to all branches which is free of the phase indication, and means for temporarily swamping the branch signal in each branch with a relatively strong unmodulated signal common to all branches, said unmodulated signal being selected so that said means for narrowband filtering locks on to the intelligence-free signal, and means for linearly combining the output signal of all branches.

4. A diversity receiver as claimed in claim 3 wherein said filtering means includes a phase-locked loop which acts as a slot filter and wherein the means for temporarily swamping the branch signal causes the phase-locked loop to lock on to and pass a narrowband signal having a frequency at the difference between the branch signal frequency and the prescribed output frequency.

5. A diversity receiver as claimed in claim 4 wherein the phase-locked loop of each branch includes a loop mixer, lowpass filter and voltage-controlled oscillator connected in series, and a feedback path from the output of the voltage controlled oscillator to the input of the loop mixer, and wherein the inputs of the voltage controlled oscillator in each branch are interconnected by a dc path and ac isolated from each other.

6. A diversity receiver as claimed in claim 4 wherein each of said branch circuits is composed entirely of integrated circuitry.

7. A diversity receiver as claimed in claim 4 wherein each of said branch circuits includes feedback means for feeding back a signal at the prescribed output frequency from the output of the linear combining means to the input of the phase-locked loop.

8. A diversity receiver as claimed in claim 7 wherein said receiver further includes an acquisition oscillator common to all branches and wherein said means for temporarily swamping the input signal includes conductive means for temporarily connecting said oscillator output to the input of the phase-locked loop in lieu of said feedback signal.

9. A diversity receiver as claimed in claim 4 wherein said receiver further includes an acquisition oscillator common to all branches and wherein said means for temporarily swamping the branch signal includes conductive means for connecting said oscillator to the branch signal path, said conductive means including switching means for open circuiting the connection after acquisition of lock-on.

10. A diversity receiver as claimed in claim 9 wherein said switching means provides isolation between the branch circuits under open circuit conditions.

11. A diversity receiver as claimed in claim 9 wherein each of said branch circuits includes an IF mixer which converts the reception of said one element to a branch signal at an intermediate frequency and wherein said conductive means applies said oscillator output to the intermediate frequency signal.

12. A diversity receiver as claimed in claim 9 wherein each of said branch circuits includes an IF mixer which converts the reception of said one element to a branch signal at an intermediate frequency and wherein said conductive means connects said oscillator and said IF mixer.

13. A diversity receiver comprising, a plurality of branch circuits, an oscillator for producing a signal at a preselected frequency, switching means for temporarily connecting the preselected signal to each of the branches, and means for combining the outputs from all of said branches, each of said branches including cophasing means for producing in-phase outputs from all branches, a phase-locked loop for maintaining the frequency of the in-phase outputs within a fixed frequency range, and means for establishing the fixed range in response to the preselected frequency signal.

14. A diversity receiver comprising:

a plurality of antenna elements for receiving on each element a signal containing transmitted intelligence information common to all elements and a phase indication exclusive to each element, a plurality of branch circuits each associated exclusively with one of said antenna elements, each branch circuit including means for generating from the reception of said one element an intelligence-free signal containing the phase indication exclusive to said one element, means for narrowband filtering the intelligence-free signal, cophasing means for combining the reception and the filtered intelligence-free signal to yield an output signal at an output frequency common to all branches and in-phase with all other output signals, and means for linearly combining the output signals of all branches, characterized in that said receiver further includes means for temporarily swamping the reception in each branch with a relatively strong unmodulated signal common to all branches to cause the filtering means to lock on to the frequency of the intelligence-free signal.

15. A diversity receiver as claimed in claim 14 wherein each of said branch circuits is composed entirely of integrated circuitry.

16. A circuit comprising a phase-locked loop, means for applying an input signal to the phase-locked loop, an acquisition oscillator for producing an unmodulated acquisition signal, switching means for applying the acquisition signal to said phase-locked loop, said acquisition signal having a frequency and amplitude selected to cause the phase-locked loop to lock on to a prescribed frequency independent of the input signal, and said switching means being operable to remove said acquisition signal upon acquisition of lock-on to said prescribed frequency.

* * * * *